(12) United States Patent
Rötger et al.

(10) Patent No.: US 8,668,165 B2
(45) Date of Patent: Mar. 11, 2014

(54) WHEEL DRIVE SYSTEM FOR AIRCRAFT WITH A FUEL CELL AS ENERGY SOURCE

(75) Inventors: Thomas Rötger, Coppet (CH); Hans-Jürgen Heinrich, Hamburg (DE); Jens-Dietrich Kurre, Buchholz (DE)

(73) Assignee: Airbus Operations GmbH (DE)

( * ) Notice: Subject to any disclaimer, the term of this patent is extended or adjusted under 35 U.S.C. 154(b) by 353 days.

(21) Appl. No.: 13/002,903

(22) PCT Filed: Jul. 6, 2009

(86) PCT No.: PCT/EP2009/058487
§ 371 (c)(1),
(2), (4) Date: Feb. 22, 2011

(87) PCT Pub. No.: WO2010/003911
PCT Pub. Date: Jan. 14, 2010

(65) Prior Publication Data
US 2011/0198439 A1   Aug. 18, 2011

Related U.S. Application Data

(60) Provisional application No. 61/134,181, filed on Jul. 7, 2008.

(30) Foreign Application Priority Data

Jul. 7, 2008   (DE) .......................... 10 2008 031 933

(51) Int. Cl.
*B64C 25/42*   (2006.01)
*B64D 41/00*   (2006.01)
*H01M 8/04*   (2006.01)

(52) U.S. Cl.
USPC ............... 244/111; 244/50; 244/58; 429/450; 429/9

(58) Field of Classification Search
USPC ............. 244/111, 53 R, 58; 454/76; 429/400, 429/418; 180/65.31, 65.21, 65.1
See application file for complete search history.

(56) References Cited

U.S. PATENT DOCUMENTS 3,807,664 A * 4/1974 Kelly et al. ..................... 244/50
3,874,619 A * 4/1975 Collins et al. .................. 244/50
4,659,039 A * 4/1987 Valdes ....................... 244/103 S (Continued)

FOREIGN PATENT DOCUMENTS

DE   19617548 A1   11/1997
DE   19815455 A1   10/1999

(Continued)

*Primary Examiner* — Joseph W Sanderson
*Assistant Examiner* — Marc Burgess
(74) *Attorney, Agent, or Firm* — Lerner, David, Littenberg, Krumholz & Mentlik, LLP

(57) ABSTRACT

A wheel drive system for an aircraft that features at least one electric motor and at least one fuel cell as energy source for the electric motor, wherein the electric motor is coupleable to at least one wheel of at least one landing gear of the aircraft. The wheel drive system reduces the fuel consumption and lowers the emission of $CO_2$ and pollutants—primarily carbon monoxide and unburned hydrocarbons. Persons, vehicles and other aircraft furthermore are not endangered by a jet blast while the aircraft is taxiing because the main engines do not have to be started until the take-off and landing strip is reached. The operation of the wheel drive system furthermore leads to a reduced noise pollution.

6 Claims, 3 Drawing Sheets

(56) References Cited

U.S. PATENT DOCUMENTS

Figure 1:
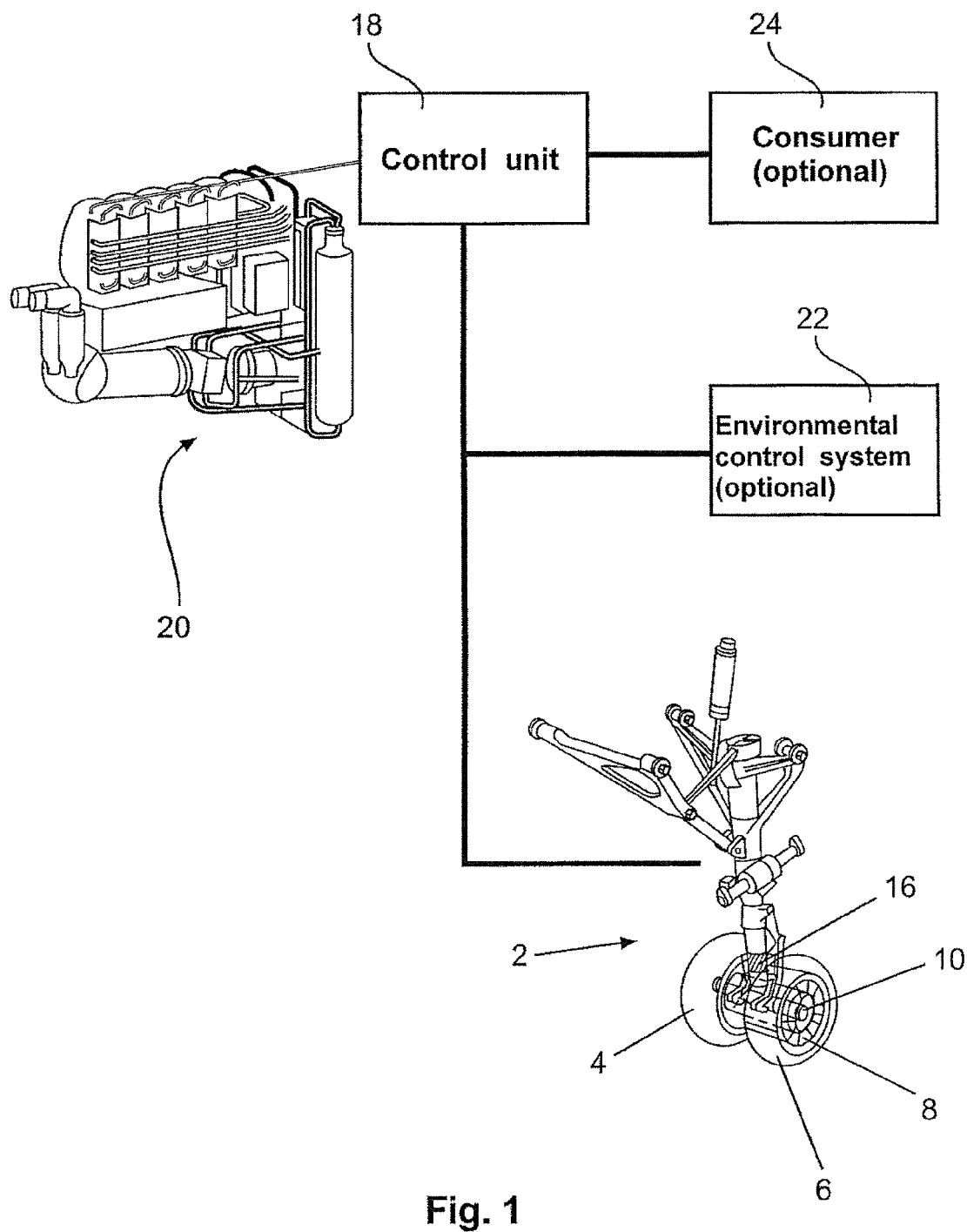

| | | | |
|---|---|---|---|
| 5,633,544 A * | 5/1997 | Toida et al. | 310/67 R |
| 5,810,284 A * | 9/1998 | Hibbs et al. | 244/13 |
| 5,936,318 A | 8/1999 | Weiler et al. | |
| 6,216,981 B1 * | 4/2001 | Helm | 244/118.5 |
| 6,296,957 B1 | 10/2001 | Graage | |
| 6,450,447 B1 | 9/2002 | Konrad et al. | |
| 6,459,231 B1 * | 10/2002 | Kagatani | 320/101 |
| 7,306,187 B2 * | 12/2007 | Lavan | 244/123.11 |
| 7,353,897 B2 * | 4/2008 | Fernandez | 701/22 |
| 7,891,609 B2 * | 2/2011 | Cox et al. | 244/121 |
| 8,220,740 B2 * | 7/2012 | Cox et al. | 244/103 R |
| 8,403,259 B2 * | 3/2013 | Charuel et al. | 244/103 S |
| 8,517,303 B2 * | 8/2013 | Dilmaghani et al. | 244/50 |
| 2004/0065489 A1 | 4/2004 | Aberle et al. | |
| 2004/0124308 A1 | 7/2004 | Daggett | |
| 2004/0245385 A1 * | 12/2004 | McElroy et al. | 244/58 |
| 2005/0048334 A1 * | 3/2005 | Sridhar et al. | 429/21 |
| 2005/0167172 A1 * | 8/2005 | Fernandez | 180/65.8 |
| 2005/0224642 A1 | 10/2005 | Sullivan | |
| 2005/0228549 A1 * | 10/2005 | Stickling | 701/3 |
| 2006/0065779 A1 | 3/2006 | McCoskey et al. | |
| 2007/0034741 A1 * | 2/2007 | Fuller | 244/58 |
| 2010/0276535 A1 * | 11/2010 | Charuel et al. | 244/50 |
| 2013/0026284 A1 * | 1/2013 | Christensen et al. | 244/50 |

FOREIGN PATENT DOCUMENTS

| | | |
|---|---|---|
| DE | 19821952 | 11/1999 |
| DE | 69512228 T2 | 4/2000 |
| DE | 19911018 | 8/2000 |
| DE | 196 17 915 C2 | 11/2001 |
| DE | 10223117 A1 | 12/2003 |
| DE | 60306613 T2 | 6/2007 |
| GB | 619254 A | 3/1949 |
| WO | 9529094 A1 | 11/1995 |
| WO | 2006138267 | 12/2006 |

* cited by examiner

WHEEL DRIVE SYSTEM FOR AIRCRAFT WITH A FUEL CELL AS ENERGY SOURCE

CROSS-REFERENCE TO RELATED APPLICATIONS

This application is a national phase entry under 35 U.S.C. §371 of International Application No. PCT/EP2009/058487, filed Jul. 6, 2009, published in German, which claims the benefit of the filing date of U.S. Provisional patent application No. 61/134,181, filed Jul. 7, 2008, and of German Patent Application No. 10 2008 031 933.3 filed Jul. 7, 2008, the entire disclosures of which are hereby incorporated herein by reference.

TECHNICAL FIELD

The invention relates to a wheel drive system for an aircraft, the use of a wheel drive system in an aircraft, as well as an aircraft with a wheel drive system and the use of a fuel cell as energy supply for a wheel drive system in an aircraft.

BACKGROUND OF THE INVENTION

The taxiing of aircraft between a parking position and a take-off and landing runway is usually realized with a tow tractor and/or with the thrust of the main engines of the aircraft. The tow tractor is required, in particular, for backing the aircraft ("Push-Back") out of its parking position ("Nose In"). The taxiing to the take-off position and from the landing point to the parking position is realized with the main engines at low thrust. In alternative procedures, the aircraft is towed to a position near the take-off position with a tow tractor such that the main engines of the aircraft can be started at the latest possible time.

As an alternative, WO 2006/138267 A2 proposes to selectively drive the landing gear of the aircraft in the forward and reverse mode by means of an electric motor. In this case, the power supply of the motor is realized with the auxiliary power unit (APU).

In the standard procedure for taxiing aircraft to a take-off and landing runway, a relatively large quantity of fuel is consumed because the main engines need to generate the thrust required for taxiing and the efficiency of the main engines is relatively poor at low power. This is also associated with significant $CO_2$ emissions. The airport personnel and neighboring residents are affected by the significant exhaust gas emissions, particularly by hydrocarbons and carbon monoxide. In addition, persons, vehicles and other aircraft are endangered by the jet blast of the main engines ("Jet Blast"). The noise generated by the main engines also represents a burden. The engine maintenance costs are increased due to the prolonged running time. Furthermore, tow tractors need to be made available for taxiing the aircraft out of the parking position such that the operating expenses are increased.

In the alternative procedure for taxiing the aircraft, the tow tractors are used much longer such that more tow tractors need to be available at an airport. In an aircraft with full fuel tanks, the attainable towing speed is also relatively slow such that backups may occur in the taxiing traffic. Furthermore, the power supply and air supply of the aircraft need to be ensured in order to operate, in particular, the air-conditioning system. This supply could be realized, for example, with the tow tractors, but this would reduce the towing capacity. The supply could selectively also be realized with the APU, but this would result in significant noise and exhaust gas emissions. In addition, the use of an APU is restricted or even prohibited in many airports. Furthermore, the APU operating time directly increases the APU maintenance costs.

SUMMARY OF THE INVENTION

It is the object of the invention to propose a wheel drive system for an aircraft including a corresponding energy source that makes it possible, in particular, to lower the exhaust gas and noise emissions. Additionally, it is an object of the invention consists to prevent prolonged operating times and increased maintenance costs for the main engines and the APU.

This object is solved with a wheel drive system for an aircraft that comprises at least one electric motor and at least one fuel cell as energy source for the electric motor, wherein the electric motor is coupleable to at least one wheel of at least one landing gear of the aircraft.

Fuel cells as an electric energy source aboard aircraft can replace a few or all functions of an APU. In addition to the electric power, the fuel cells themselves neither produce pollutants, noise nor $CO_2$ as byproducts, but only water. A limited quantity of exhaust gases is only produced if the hydrogen is obtained from kerosene in the aircraft by means of a "reforming" process. In addition, the efficiency of a fuel cell is much higher than that of a conventional APU such that the use of a fuel cell leads to a lower fuel consumption. In comparison with a supply by the APU, the wheel drive system according to the invention therefore makes the use of a motorized landing gear more economical, environmentally friendly and much more attractive. In airports with restrictions regarding the APU operation, it is still possible to utilize the landing gear motors operated with fuel cells in an unrestricted fashion.

In an advantageous improvement, the electric motor is designed for generating a torque opposite to the rotating direction of the wheel in order to decelerate the aircraft. This could be realized, for example, by operating the electric motor as a generator while decelerating and storing the energy generated while decelerating in suitable devices. A critical deceleration can also be managed under adverse ground conditions by generating a torque in the opposite direction in a controlled fashion with a suitably chosen and dimensioned electric motor such that it is possible, in particular, to minimize the thermal load on the landing gear. This relieves the stress on the conventional landing gear brakes of the aircraft such that their wear and maintenance frequency can be reduced.

A preferred embodiment of the inventive wheel drive system furthermore comprises a control unit for controlling the torque to be generated or absorbed by the motor. This would make it possible, for example, to realize an integration into a so-called "brake-to-vacate" system, in which the braking power is optimized to the effect that the aircraft reliably reaches a predetermined taxiway after its landing.

In a preferred embodiment of the wheel drive system according to the invention, the electric motor delivers electric energy to at least one storage unit and/or to at least one consumer in the generator mode. Due to the storage of the electric energy generated in the generator mode, the overall consumption of electric energy in the aircraft can be reduced.

In a particularly preferred wheel drive system, the storage unit is realized with at least one capacitor. This capacitor could consist of a so-called "super capacitor" that, due to its high capacitance, is able to store large amounts of electric energy in the shortest time possible. The electric energy stored in the capacitors can be withdrawn again just as fast such that the inventive wheel drive system is particularly suitable for boosting the energy supply from the fuel cells during peak loads in the electrical system of the aircraft.

In another advantageous embodiment of the wheel drive system according to the invention, the storage unit is realized with an electrolysis device. This electrolysis device serves, for example, for obtaining hydrogen and oxygen from water, wherein the obtained hydrogen can subsequently be used for operating the fuel cell if it is stored accordingly. In this case, the electrolysis device may consist of the or a fuel cell that is not used for generating electric energy, but rather utilizes electric energy and supplied water in order to separate the two elements hydrogen and oxygen from the supplied water in a reverse fuel cell process. However, the wheel drive system according to the invention is not limited to the use of either capacitors, electrolysis devices or other storage units only, but rather makes it possible to use all types of known storage units in parallel. This not only would make it possible to compensate electric load peaks, but also to simultaneously generate hydrogen for operating a fuel cell.

It is furthermore particularly preferred to provide a water storage device for accommodating water from the fuel cells. The water generated in the fuel cell as a combustion product is very clean such that it could be used, for example, for cooling equipment or even as drinking water if it is processed accordingly.

It is particularly preferred to supply the electrolysis device with water from the water storage device. Consequently, the water accumulated during the normal fuel cell process could be reused and once again separated into hydrogen and oxygen while braking—during the operation of the electric motor as a generator. This could eliminate the need to withdraw water for the electrolysis device from the on-board water supply system such that it would be possible to eliminate other lines and valves. The water produced in the fuel cell could alternatively or additionally be used for cooling the conventional brakes of the landing gear, wherein the water could be sprayed onto the brakes and evaporate thereon.

A preferred wheel drive system is designed for reducing the electric energy supply to other electric consumers of the aircraft in order to increase the electric energy supply to the electric motor. If the power required for driving the landing gear is only slightly lower than the maximum power of the fuel cell, the electric energy supply to other consumers is reduced with a suitable control, wherein it would be possible, in particular, to operate the air-conditioning system for air-conditioning the aircraft cabin in the economy mode while taxing. In hot weather, the loss of comfort resulting from an air-conditioning system that runs in the economy mode can be minimized by adjusting the temperature in the aircraft cabin slightly lower than usual before taxiing such that the comfortable temperature range is not exceeded when taxiing is completed. In cold weather, the waste heat of the fuel cell may also be used for heating the cabin. The control of the consumers can be realized with the aforementioned control unit or another suitable control unit.

In a preferred embodiment of the wheel drive system according to the invention, the electric motor is coupleable to the wheel by means of a gear drive, wherein a torque sensor arranged in the drive train can be connected to the control unit. The gear drive between the electric motor and the drive wheel of the landing gear could be realized, for example, with several chain gears. It would also be conceivable to use conventional toothed gear drives alternatively or in combination therewith. If so required, the gear drive could be realized such that it can be switched to several different transmission ratios in order to travel long distances with higher speeds. The gear drive could be switched back to a higher transmission ratio in order to accelerate the aircraft to a slow speed from a standstill. This provides the advantage that the electric motor is operated in an optimal speed range such that it can have smaller dimensions. The torque sensor arranged in the drive train between the electric motor and the wheel makes it possible to determine the respective torque while accelerating or while decelerating such that the control unit can determine the braking power while braking and controls the supplied electric energy in the taxiing mode. In addition, information on the actual torque could be useful in the operation of a guidance system for realizing automatic taxiing because acceleration and braking processes could be controlled in a predictive and energy-efficient fashion.

In addition, the taxiing drive could be used for remote-controlling an aircraft from mobile stations, control stations or from the tower.

The object is furthermore solved with a use of the wheel drive system and an aircraft with at least one inventive wheel drive system.

SHORT DESCRIPTION OF THE DRAWINGS

Figure 2A:
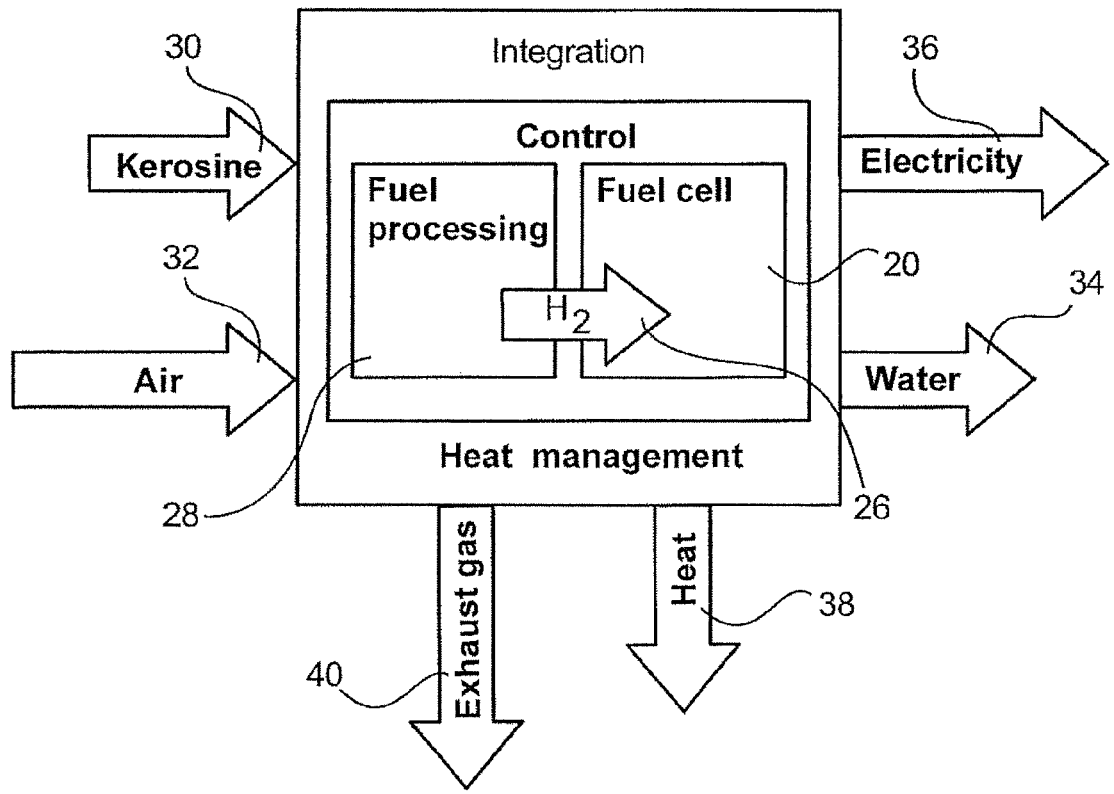

Other features, advantages and possible applications of the present invention result from the following description of exemplary embodiments and the figures. In this respect, all described and/or graphically illustrated features form the object of the invention individually and in arbitrary combinations, namely regardless of their composition in individual claims or their reference to other claims. In the figures, identical or corresponding objects are furthermore identified by the same reference symbols. It is shown:

FIG. 1: An overview of the wheel drive system according to the invention;

FIG. 2a+b: Two fuel cell architectures for the wheel drive system according to the invention; and FIG. 3: A fuel cell in the electrolysis mode.

DETAILED DESCRIPTION OF EXEMPLARY EMBODIMENTS

FIG. 1 shows an overview of one possible embodiment of the wheel drive system according to the invention. In addition to the usual assemblies such as wheels 4 and 6, tires, shock absorbers, latching mechanism, retracting mechanism, flaps, brakes and emergency lowering springs, the landing gear 2 also comprises the following assemblies: an electric motor 8, a gear drive 10 and control and measuring electronics/sensor 16. The electric motor 8 is coupled to the wheels 4 and 6 via a gear drive 10. A torque sensor 16 is used for determining the torque generated or absorbed by the motor 8. The determined torque value can be used, for example, for optimizing the braking process or an acceleration process and therefore the electric energy supply.

The electric motor 8 is connected to a control unit 18 that controls the supply of electric energy to the electric motor 8 and optionally to other consumers from and to a fuel cell 20. In the taxiing mode, the control unit 18 routes electric energy to the electric motor 8 from the fuel cell 20 such that the wheels 4 and 6 can be driven. During the ground operation of the aircraft, for example, an environmental control system 22 and other electrical consumers 24 can optionally also be supplied with electric energy from the fuel cell 20 by the control unit 18. If the power output of the fuel cell 20 is only slightly lower than the power consumed by the electric motor 8, the control unit 18 reduces the supply of electric energy to the environmental control system 22 and the consumers 24 such that they operate in the economy mode.

FIG. 2a generally shows the fuel cell architecture for the wheel drive system according to the invention. The fuel cell 20 is supplied with hydrogen 26 that is obtained from kerosene 30 by means of a "reformer" 28 in the embodiment shown. In addition to kerosene 30, air 32 is supplied to the fuel cell 20 such that electric power 36, heat 38 and exhaust gases 40 are produced in addition to water 34 during the operation of the fuel cell 20. Due to the high availability of kerosene, it would be possible to eliminate the additional weight of storage devices for gaseous hydrogen. However, the operation of the fuel cell 20 is not limited to hydrogen produced from fuel, but it would also possible to supply hydrogen from a separate storage device that is refueled on the ground or filled by means of an electrolysis process during the ground stop of the aircraft. In this case, the electrolysis process can be carried out by means of a fuel cell 20 in a reverse fuel cell process. The exhaust gases 40 can be avoided by utilizing pure hydrogen.

Figure 2B:
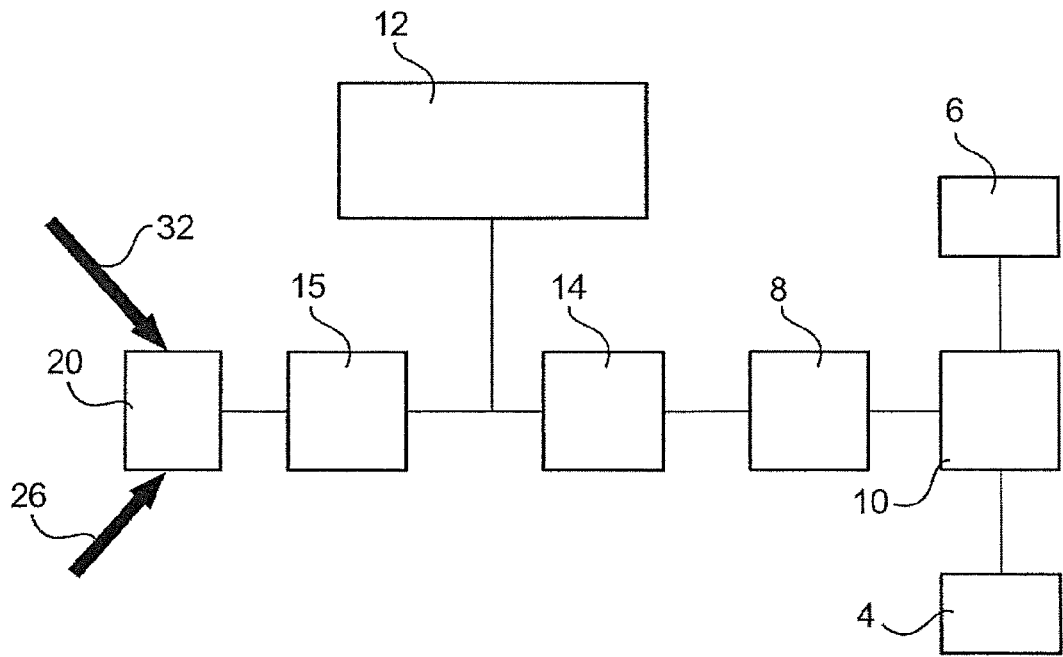

FIG. 2b shows a second possible architecture, in which hydrogen 26 and atmospheric oxygen 32 are directly used for operating the fuel cell 20. The system is realized in the form of a hybrid system. A fuel cell 20 makes available the required energy for the landing gear drive and keeps the battery or the super capacitors 12 charged. The connection of the battery or super capacitor shown is realized in parallel. However, the object can also be attained with a series connection by coupling at least one fuel cell to at least one battery or capacitor.

The battery or the super capacitors 12 make available additional energy for the acceleration. The motor 8 may also function as a brake. In this case, the motor may be realized in the form of a generator and the energy can be returned to the battery or the super capacitors 12. It is advantageous to integrate an inverter 14 for inverting the DC voltage from the battery or the super capacitors 12 into the system if the motor 8 can be realized in the form of an AC motor. Likewise, it is sensible or necessary to utilize a DC-DC converter 15 in order to adjust an optimal voltage for charging the battery or the super capacitors 12 and for operating the motor 8.

Figure 3:
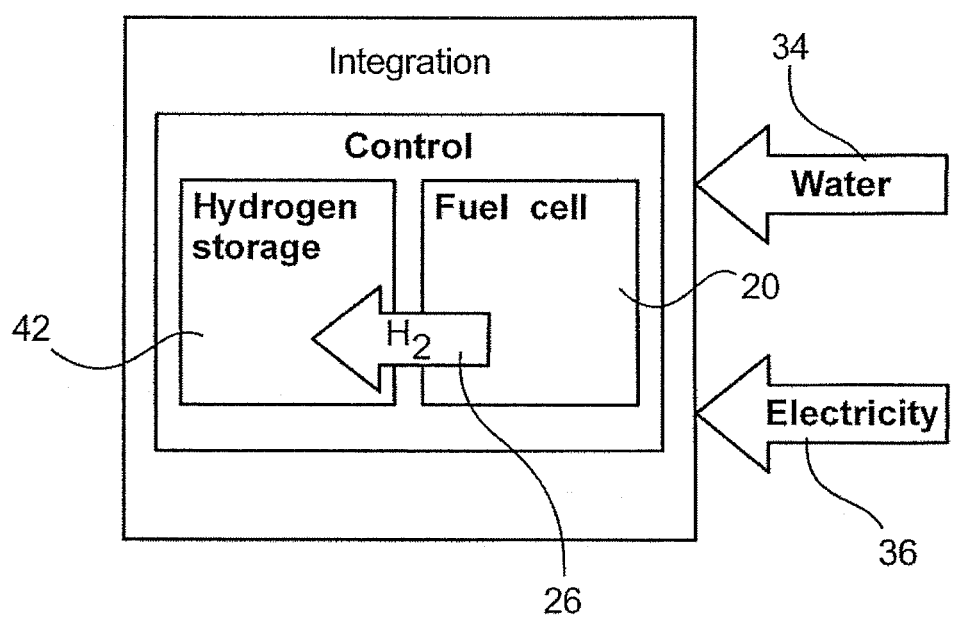

FIG. 3 shows an overview of the operation of the fuel cell 20 as an electrolysis device. The fuel cell 20 is supplied with water 34 and electric energy 36. Within the fuel cell 20, the water 34 is split into its elementary components hydrogen 26 and oxygen, wherein the hydrogen 26 can be stored in a storage unit 42. This storage unit 42 can once again supply hydrogen 26 during the conventional operation of the fuel cell 20, namely additionally or alternatively to the hydrogen obtained from fuel 30 or in combination with the previously stored hydrogen.

The wheel drive system according to the invention results in numerous advantages. The energy requirement of the electric motor is lower than the energy requirement of the main engine, particularly due to its inferior efficiency at low thrust. This makes it possible to directly lower the fuel consumption and therefore the costs and to reduce the emission of $CO_2$ and pollutants—primarily carbon monoxide and unburned hydrocarbons. In addition, persons, vehicles and other aircraft are not endangered by the jet blast while the aircraft is taxiing because the main engines do not have to be started until the take-off and landing strip is reached. No tow tractor is required for backing out of the parking position such that an autonomous taxiing mode can be realized if no tow tractors are available or in order to achieve very short turnaround times and the productivity of the aircraft, as well as of the airport (availability of parking spaces), is increased. It could also be advantageous to integrate the control by means of electronic guidance systems such that the aircraft could also be remotely guided to an available take-off and landing strip.

Since the electric motor is supplied with power by the fuel cell, the energy requirement is also considerably lower due to the superior efficiency of the fuel cell in comparison with an auxiliary power unit (APU). Neither noise, fine dust nor—except by the reforming process—exhaust gases are produced. Consequently, the system can also be operated in airports, in which the operation of an APU is restricted or prohibited.

Fuel cells also require little maintenance such that the high maintenance costs for the operation of an APU or the main engines are eliminated. The generator mode of the electric motor makes it possible to achieve a braking effect such that the abrasion of the brake discs and therefore the emission of fine dust can be additionally reduced. In a parking position, an existing ground power supply can be used for generating hydrogen that can subsequently be used as fuel with the aid of the fuel cell that operates in the reverse mode.

In addition to the aforementioned advantages, it would furthermore be possible to accelerate the wheels of the landing gears to a suitable circumferential speed such that the tire wear can be reduced.

As a supplement, it should be noted that "comprising" does not exclude any other elements or steps, and that "a" or "an" does not exclude a plurality. It should furthermore be noted that characteristics that were described with reference to one of the above exemplary embodiments can also be used in combination with other characteristics of other above-described exemplary embodiments. Reference symbols in the claims should not be interpreted in a restrictive sense.

REFERENCE SYMBOLS

2 Landing gear
4 Wheel
6 Wheel
8 Electric motor
10 Gear drive
12 Battery/super capacitor
14 Inverter
15 DC-DC converter
16 Torque sensor
18 Control unit
20 Fuel cell
22 Environmental control system
24 Electrical consumer
26 Hydrogen
28 Reformer
30 Kerosene
32 Air
34 Water
36 Electric power
38 Heat
40 Exhaust gas
42 Storage unit

The invention claimed is:
1. An aircraft, comprising:
at least one electric motor; and
at least one fuel cell as energy source for the at least one electric motor;
a control unit for controlling the torque to be generated or absorbed by the at least one electric motor; and
at least one landing gear;
wherein the at least one electric motor is coupled to at least one wheel of the at least one landing gear;
wherein the at least one electric motor is configured for generating a torque opposite to the rotating direction of the at least one wheel to decelerate the aircraft;

wherein the at least one electric motor is configured to deliver electric energy to at least one storage unit or at least one electric consumer in a generator mode;

wherein the at least one electric motor and the at least one fuel cell are configured to be the exclusive power source to the at least one landing gear to enable taxiing and other ground operations of the aircraft; and wherein the at least one storage unit comprises a water electrolysis device wherein the control unit is programmed for adjusting a temperature in a cabin of the aircraft before taxiing relative to the outside temperature in such a way that a comfort temperature range is not exceeded during the entire taxiing process due to a temporary loss of power to the environmental control system during the taxiing of the aircraft.

2. The aircraft of claim 1, wherein the electrolysis device comprises the fuel cell.

3. The aircraft of claim 1, further comprising a water storage device for accommodating water from the fuel cell.

4. The aircraft of claim 3, wherein the electrolysis device is supplied with water from the water storage device.

5. The aircraft of claim 1, wherein the control unit is programmed to initiate a reduction of electric energy supply to the at least one electric consumer of the aircraft in order to increase the electric energy supply to the at least one electric motor.

6. The aircraft of claim 1, wherein the at least one electric motor is coupled to the at least one wheel by a gear drive, and wherein a torque sensor arranged in a drive train is connected to the control unit.

* * * * *